(12) United States Patent
Davell et al.

(10) Patent No.: US 9,779,615 B2
(45) Date of Patent: Oct. 3, 2017

(54) PERMITTING PROCESSING SYSTEM FOR A MONITORING ON DEMAND SECURITY SYSTEM

(71) Applicant: ADT US HOLDINGS, INC., Boca Raton, FL (US)

(72) Inventors: Bergen Davell, Wheat Ridge, CO (US); James Armstead, Granger, IA (US); Robert W. Moore, Wellington, FL (US); Jeff Bonin, Longmont, CO (US)

(73) Assignee: ADT US Holdings, Inc., Boca Raton, FL (US)

( * ) Notice: Subject to any disclaimer, the term of this patent is extended or adjusted under 35 U.S.C. 154(b) by 0 days.

(21) Appl. No.: 15/334,962

(22) Filed: Oct. 26, 2016

(65) Prior Publication Data

US 2017/0116843 A1 Apr. 27, 2017

Related U.S. Application Data (60) Provisional application No. 62/246,298, filed on Oct. 26, 2015.

(51) Int. Cl.
| | |
|---|---|
| *G08B 25/08* | (2006.01) |
| *G06K 9/00* | (2006.01) |
| *H04M 11/04* | (2006.01) |
| *G08B 25/00* | (2006.01) |

(52) U.S. Cl.
CPC ....... *G08B 25/008* (2013.01); *G06K 9/00771* (2013.01); *H04M 11/04* (2013.01)

(58) Field of Classification Search
None
See application file for complete search history.

(56) References Cited

U.S. PATENT DOCUMENTS

| | | | | |
|---|---|---|---|---|
| 9,424,737 | B2* | 8/2016 | Bailey | G08B 25/001 |
| 2004/0080401 | A1* | 4/2004 | Stewart | G08B 7/06 340/331 |
| 2007/0193834 | A1* | 8/2007 | Pai | G08B 25/008 186/3 |
| 2012/0317507 | A1* | 12/2012 | Gutierrez | H04N 7/181 715/771 |
| 2013/0246501 | A1* | 9/2013 | Scheer | G08B 25/006 709/202 |
| 2014/0159895 | A1* | 6/2014 | Bleisch | G08B 25/004 340/539.14 |
| 2014/0266679 | A1* | 9/2014 | Shapiro | G08B 21/02 340/516 |
| 2015/0029020 | A1* | 1/2015 | Bailey | G08B 25/005 340/502 |
| 2017/0109836 | A1* | 4/2017 | Somerville | G06Q 40/125 |
| 2017/0116482 | A1* | 4/2017 | Lin | G06K 9/00771 |

* cited by examiner

*Primary Examiner* — Fekadeselassie Girma
(74) *Attorney, Agent, or Firm* — Christopher & Weisberg, P.A.

(57) ABSTRACT

A premises apparatus is provided. The premises apparatus includes a processor configured to: determine that at least one monitoring service is being requested for activation and determine permit data associated with the at least one monitoring service. The processor is father configured to, if the determined permit data indicates at least one permit is required for the at least one monitoring service: transmit a request for at least one permit that is required for activation of the at least one monitoring service and, after transmitting the request for the at least one permit for activation of the at least one monitoring service, activate the at least one monitoring service.

20 Claims, 6 Drawing Sheets

PERMITTING PROCESSING SYSTEM FOR A MONITORING ON DEMAND SECURITY SYSTEM

CROSS-REFERENCE TO RELATED APPLICATION

This application is related to and claims priority to U.S. Provisional Patent Application Ser. No. 62/246,298, filed Oct. 26, 2015, entitled "AUTOMATIC PERMITTING UPON ACTIVATION OF MONITORING ON DEMAND SECURITY SYSTEM FUNCTION," the entirety of which is incorporated herein by reference.

FIELD

The present invention relates to security systems and in particular to a system for acquiring a permit for a premises alarm system.

BACKGROUND

Popularity of premises systems continues to grow at a rapid pace. These premises systems provide security, life safety, and/or home automation services to a premises such as a home or building. Installation of these premises systems typically involves an installer that visits the premises to install a control panel and multiple sensors, and to ensure the control panel can communicate with a monitoring center.

However, installation has gotten more complicated over the past years due in part to the differing requirements in various jurisdictions for permit(s) in order to install and/or operate certain features of the premises system. For example, the home owner may be required to acquire a permit for the premises system only if the premises system is going to be monitored by the monitoring center. Or, it may depend on whether aspects of the systems are wired, and the electrical specifications of devices. Conversely, a permit may be required irrespective of the type of functionality or services that the premises system is providing. Further adding to the complication, some jurisdictions offer various alarm permits that are specific to the type of monitoring services to be provided. For example, one type of permit may be required for monitoring of fire conditions, i.e., a fire alarm permit, while a different permit may be required for monitoring of security conditions, i.e., a police alarm permit. Each jurisdiction: city, county, state, municipality, etc. may have different permit requirements, thereby making the permit acquisition process even more difficult.

SUMMARY

The present invention advantageously provides a device, method and system for acquiring a premises alarm system permit.

According to one embodiment, a premises apparatus is provided. The premises apparatus includes a processor configured to: determine that at least one monitoring service is being requested for activation and determine permit data associated with the at least one monitoring service. The processor is father configured to, if the determined permit data indicates at least one permit is required for the at least one monitoring service: transmit a request for at least one permit that is required for activation of the at least one monitoring service and after transmitting the request for the at least one permit for activation of the at least one monitoring service, activate the at least one monitoring service.

According to one embodiment of this aspect, the processor is further configured to: cause at least a portion of the determined permit data to be displayed for acceptance by a user, determine whether a user has accepted the determined permit data, and the transmitting of the request for the at least one permit being in response to determining that the user has accepted the determined permit data. According to another embodiment of this aspect, the processor is further configured to: determine a location of the premises apparatus, compare the determined location of the premises apparatus with a location stored at premises apparatus, and if the determined location of the premises apparatus does not match with the location stored at premises apparatus, at least temporarily deactivate the at least one monitoring service.

According to another embodiment of this aspect, the determined location of the premises apparatus is determined based on one of an internet protocol address of the premises apparatus and global positioning coordinates of the premises apparatus. According to another embodiment of this aspect, the processor is further configured to transmit a request for at least one permit that is required for activation of the at least one monitoring service at the determined location. According to another embodiment of this aspect, the request for the at least one permit that is required for activation of the at least one monitoring service at the determined location is transmitted to one of a customer associated with the premises apparatus and a jurisdictional entity associated with the determined location.

According to another embodiment of this aspect, the at least one monitoring service includes at least one of fire alarm monitoring service and security alarm monitoring service. According to another embodiment of this aspect, the processor is further configured to: determine whether at least one premises sensor has been installed, the at least one premises sensor being associated with the at least one monitoring service being requested, and in response to determining the at least one premises sensor associated with the at least one monitoring service has not been installed, at least delay the activation of the at least one monitoring service. According to another embodiment of this aspect, the processor is further configured to: in response to determining the at least one premises sensor associated with the at least one monitoring service has not been installed, cause transmission of at least one notification to at least one user device associated with the premises apparatus, the notification indicating the at least one premises sensor that needs to be installed for activation of the at least one monitoring service. According to another embodiment of this aspect, the at least one premises sensor is at least one life safety sensor including at least one of a motion sensor, fire sensor, carbon monoxide sensor, flooding sensor and contact sensor.

According to another embodiment, a method is provided. A determination is made that at least one monitoring service is being requested for activation. A determination is made that permit data associated with the at least one monitoring service. If the determined permit data indicates at least one permit is required for the at least one monitoring service: a request for at least one permit that is required for activation of the at least one monitoring service is transmitted. After transmitting the request for the at least one permit for activation of the at least one monitoring service, the at least one monitoring service is activated.

According to one embodiment of this aspect, at least a portion of the determined permit data is caused to be displayed for acceptance by a user. A determination is made whether a user has accepted the determined permit data. The transmitting of the request for the at least one permit being in response to determining that the user has accepted the determined permit data. According to another embodiment of this aspect, a location of a premises apparatus is determined. The determined location of the premises apparatus is compared with a stored location of the premises apparatus. If the determined location of the premises apparatus does not match with the stored location of the premises apparatus, the at least one monitoring service is at least temporarily deactivated.

According to another embodiment of this aspect, the determined location of the premises apparatus is determined based on one of an internet protocol address of the premises apparatus and global positioning coordinates of the premises apparatus. According to another embodiment of this aspect, a request for at least one permit that is required for activation of the at least one monitoring service at the determined location is transmitted. According to another embodiment of this aspect, the request for the at least one permit that is required for activation of the at least one monitoring service at the determined location is transmitted to one of a customer associated with the premises apparatus and a jurisdictional entity associated with the determined location.

According to another embodiment of this aspect, the at least one monitoring service includes at least one of fire alarm monitoring service and security alarm monitoring service. According to another embodiment of this aspect, a determination is made whether at least one premises sensor has been installed, the at least one premises sensor being associated with the at least one monitoring service being requested. In response to determining the at least one premises sensor associated with the at least one monitoring service has not been installed, at least delaying the activation of the at least one monitoring service. According to another embodiment of this aspect, in response to determining the at least one premises sensor associated with the at least one monitoring service has not been installed, transmission of at least one notification to at least one user device associated with the premises apparatus is caused. The notification indicating the at least one premises sensor that needs to be installed for activation of the at least one monitoring service. According to another embodiment of this aspect, the at least one premises sensor is at least one life safety sensor including at least one of a motion sensor, fire sensor, carbon monoxide sensor, flooding sensor and contact sensor.

According to another embodiment, a premises security system is provided. The premises security system includes at least one sensor and a premises apparatus. The premises apparatus includes a processor configured to: determine that at least one monitoring service is being requested for activation, determine a location of the premises apparatus and determine permit data associated with the at least one monitoring service. The determination of permit data associated with the at least one monitoring service is based on the determined location of the premises apparatus. The processor is further configured to: if the determined permit data indicates at least one permit is required for the at least one monitoring service: transmit a request for at least one permit that is required for activation of the at least one monitoring service, determine whether the at least one premises sensor has been installed in the premises system, the at least one premises sensor being associated with the at least one MOD service being requested, and in response to determining the at least one premises sensor associated with the at least one MOD service has been installed and after transmitting the request for the at least one permit for activation of the at least one monitoring service, activate the at least one MOD service.

According to one embodiment of this aspect, the processor is further configured to: compare the determined location of the premises apparatus with a stored location of the premises apparatus, and if the determined location of the premises apparatus does not match with the stored location of the premises apparatus, at least temporarily inhibiting activation of the at least one monitoring service.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

A system, apparatus and method for automatically permitting of one or more services of a premises alarm system are provided and described herein. In one or more embodiments, the invention advantageously acquires one or more permits for one or more monitoring services such as monitoring-on-demand (MOD) services, thereby helping insure that the premises system is in compliance with one or more rules/laws/codes/ordinances of one or more jurisdictions. In one or more embodiments, the system monitors whether a user has requested one or more MOD services such that a request for permits for the requested service is automatically initiated. In one or more embodiments, the invention advantageously monitors whether one or more required permits have issued for one or more MOD services associated with a premises, and sends reminders to one or more users and/or devices associated with the premises if a permit has not issued, thereby helping ensure that the user submits the required permit application(s)/request(s) for user requested MOD service(s). These advantages help reduce the occurrence of premises systems operating without required permits, which may lead to fines. This arrangement also helps guide the one or more users associated with the premises system through the permitting process, which may vary from county to county, city to city and/or state to state.

An MOD service includes the ability of a customer to separately purchase a monitoring services for a device "on demand" instead of or in addition to purchasing, for example, a conventional security service contract that includes professional installation and use of security equipment as part of receiving monitoring of that equipment for a fixed term. For example, a device may be purchased at retail by a customer for use solely by the customer (i.e., "self-monitored").

Accordingly, the system, apparatus and method components have been represented where appropriate by convention symbols in the drawings, showing only those specific details that are pertinent to understanding the embodiments of the invention so as not to obscure the disclosure with details that will be readily apparent to those of ordinary skill in the art having the benefit of the description herein. As used herein, relational terms, such as "first" and "second," "top" and "bottom," and the like, may be used solely to distinguish one entity or element from another entity or element without necessarily requiring or implying any physical or logical relationship or order between such entities or elements. In embodiments described herein, the joining term, "in communication with" and "connected to," and the like, may be used to indicate electrical or data communication, which may be accomplished by physical contact, induction, electromagnetic radiation, radio signaling, infrared signaling or optical signaling, for example. The above methods of achieving electrical or data communication are non-limiting and mentioned only for illustration. One having ordinary skill in the art will appreciate that multiple components may interoperate and modifications and variations are possible of achieving the electrical and data communication.

Figure 1:
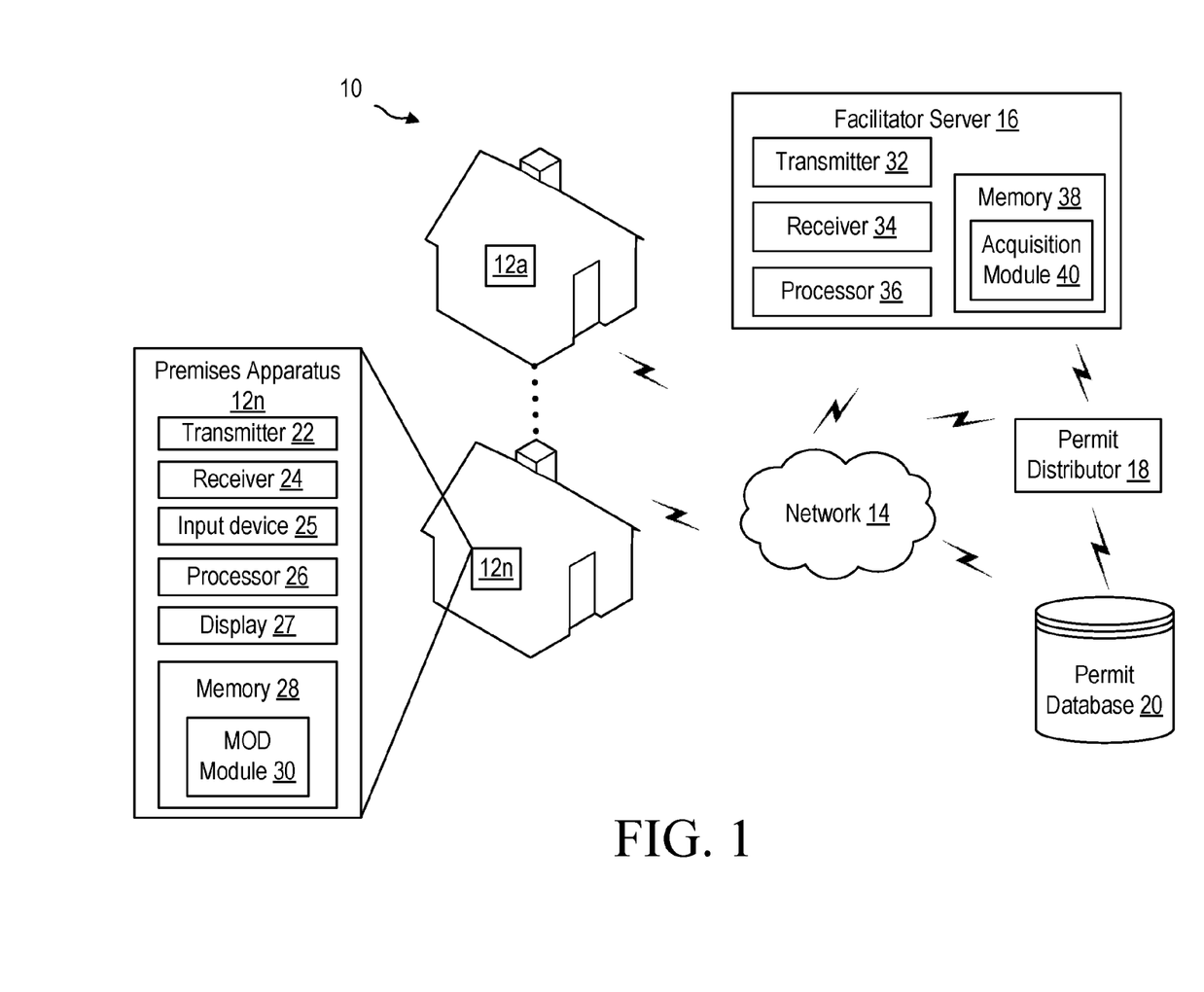
FIG. 1 illustrates a system for automatic permitting constructed in accordance with the principles of the invention.

Referring now to the drawings figures in which like reference designators refer to like elements there is shown in FIG. 1 a system constructed in accordance with the principles of the invention and designated generally as "10." System 10 may include one or more premises apparatuses 12a to 12n (collectively referred to as "premises apparatus 12"), one or more networks 14, one or more facilitator servers 16, one or more permit distributors 18 and one or more permit databases 20.

Premises apparatus 12 is a premises monitoring system such as an all-in-one security system, Do-It-Yourself (DIY) security system, part of a premises security system with sensors and/or premises systems that is capable of providing security alarm monitoring services and/or home automation monitoring services. In one or more embodiments, premises apparatus 12 includes transmitter 22 and receiver 24 for communicating directly and/or indirectly (e.g., via network 14) with one or more elements of FIG. 1 such as facilitator server 16, permit distributor 18 and/or permit database 20. In one or more embodiments, premises apparatus 12 communicates with one or more premises devices such as sensors, control panels, control devices, images capture devices, life safety devices, life style devices and/or other devices. For example, the types of sensors may include various life safety related sensors such as motion sensors, fire sensors, carbon monoxide sensors, flooding sensors and contact sensors, among other sensor types that are known in the art. The control devices may include, for example, one or more life style related devices configured to adjust at least one premises setting such as lighting, temperature, energy usage, door lock and power settings, among other settings associated with the premises or devices on the premises. Image capture devices may include digital cameras and/or video cameras, among other image capture devices that are well known in the art.

Premises apparatus 12 includes one or more input devices 25 for receiving user inputs. Input devices 25 may include a keyboard, touchscreen, buttons and/or other components/devices for receiving user inputs. Premises apparatus 12 includes one or more processors 26 for performing the functions described herein with respect to premises apparatus 12. Premises apparatus includes display 27 for displaying information to one or more users. Premises apparatus 12 includes memory 28. Memory 28 includes non-volatile and/or volatile storage device(s) capable of storing data including, for example, solid-state memory, optical storage, and magnetic storage. Also, volatile memory may include random access memory and others known in the art. In one or more embodiment, memory 28 stores Monitoring-On-Demand (MOD) module 30. MOD module 30 includes instructions, which when executed by processor 26, causes processor 26 to perform the processes described herein, such as the process for managing the permitting of one or more MOD services of premises apparatus 12, discussed in detail with reference to FIG. 2. An alternative embodiment of MOD module 30 that performs an alternative process for managing the permitting of one or more MOD services of premises apparatus 12 is discussed in detail with respect to FIG. 3. Yet another alternative embodiment of MOD module 30 that performs an alternative process for managing the permitting of one or more MOD services of premises apparatus 12 is discussed in detail with respect to FIG. 5. The one or more modules described herein may be implemented, for example, in hardware in a processor or as a combination of hardware and software. Programmatic code to implement aspects of the modules, including instructions and functions executed on the one or more processors may be stored in one or more memories. For example, programmatic code to implement aspects of MOD module 30, including instructions and functions executed on processor 26 may be stored in memory 28. Memory 28 may store other data such as user information, premises characteristics, etc. In one or more embodiments, premises apparatus 12 includes at least one of one or more sirens, one or more cameras and one or more detectors/sensors.

In one or more embodiments, processor 26 and memory 28 form processing circuitry. In addition to a traditional processor and memory, processing circuitry may comprise integrated circuitry for processing and/or control, e.g., one or more processors and/or processor cores and/or FPGAs (Field Programmable Gate Array) and/or ASICs (Application Specific Integrated Circuitry). Processor may be configured to access (e.g., write to and/or reading from) memory 28, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 28 may be configured to store code executable by processor 26 and/or other data, e.g., data pertaining to communication, e.g., configuration and/or address data of devices, etc. Processing circuitry may be configured to control any of the methods and/or processes described herein and/or to cause such methods and/or processes to be performed, e.g., by premises apparatus 12.

System 10 includes one or more networks 14. Network 14 may be the Internet, wide area network, local area network, wireless local network and metropolitan area network, among other networks known in the art. Network 14 provides communications between one or more elements illustrated in FIG. 1, such as communication between premises apparatus 12 and facilitator server 16. Facilitator server 16 includes one or more transmitters 32 and one or more receivers 34 for communicating directly and/or indirectly (e.g., via network 14) with one or more elements of FIG. 1. Facilitator server 16 includes one or more processors 36 and one or more memories 38 that substantially correspond to like elements of premises apparatus 12 with size, performance and function varying depending on implementation details. In one or more embodiments, memory 38 is configured to store acquisition module 40 that performs the permit acquisition process, discussed in detail with respect to FIG. 4. An alternative embodiment of acquisition module 40 that performs an alternative acquisition process is discussed in detail with respect to FIG. 6. In one or more embodiments, processor 36 and memory 38 form processing circuitry. In addition to a traditional processor and memory, processing circuitry may comprise integrated circuitry for processing and/or control, e.g., one or more processors and/or processor cores and/or FPGAs (Field Programmable Gate Array) and/or ASICs (Application Specific Integrated Circuitry). Processor may be configured to access (e.g., write to and/or reading from) memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 38 may be configured to store code executable by processor 36 and/or other data, e.g., data pertaining to communication, e.g., configuration and/or address data of devices, etc. Processing circuitry may be configured to control any of the methods and/or processes described herein and/or to cause such methods and/or processes to be performed, e.g., by facilitator server 16.

Of note, although FIG. 1 and the discussion herein refers to MOD module 30 and acquisition module 40 in terms of software stored in a memory (memory 28 and memory 38, respectively) and executed by a processor, the disclosure is not limited to such. It is contemplated that MOD module 30 and acquisition module 40 can be implemented solely in hardware, such as via an application specific integrated circuit (ASIC), programmable gate array (PGA) or some other combination of logic elements and/or circuitry. Further, although facilitator server 16 and premises apparatus 12 are shown in FIG. 1 as provided self-contained units, implementations are not limited to such. It is contemplated that the features and functions of facilitator server 16 and premises apparatus 12 can be distributed among different physical devices and locations. For example, functions of the acquisition module 40 can be distributed among several servers and computing devices in a single location or across network 14.

System 10 includes one or more permit distributors 18. In one or more embodiments, permit distributor 18 is an entity that functions to issue one or more permits for one or more MOD services of premises apparatus 12. For example, permit distributor may be a governmental, county and/or city affiliated entity that accepts permit applications for permit apparatus 12 and/or one or more MOD services, and determines whether to issue the permit(s) based on the submitted permit application(s). In one or more embodiments, permit distributor 18 transmits an electronic version of the issued permit(s) to permit database 20, facilitator server 16 and/or premises apparatus 12 in response to issuing the permit(s) and/or in response to an update request. System 10 includes one or more permit databases 20. Permit database 20 is configured to store permit data, premises data, issued permits data, MOD services data and/or other information associated with permitting of one or more MOD services for one or more premises.

Figure 2:
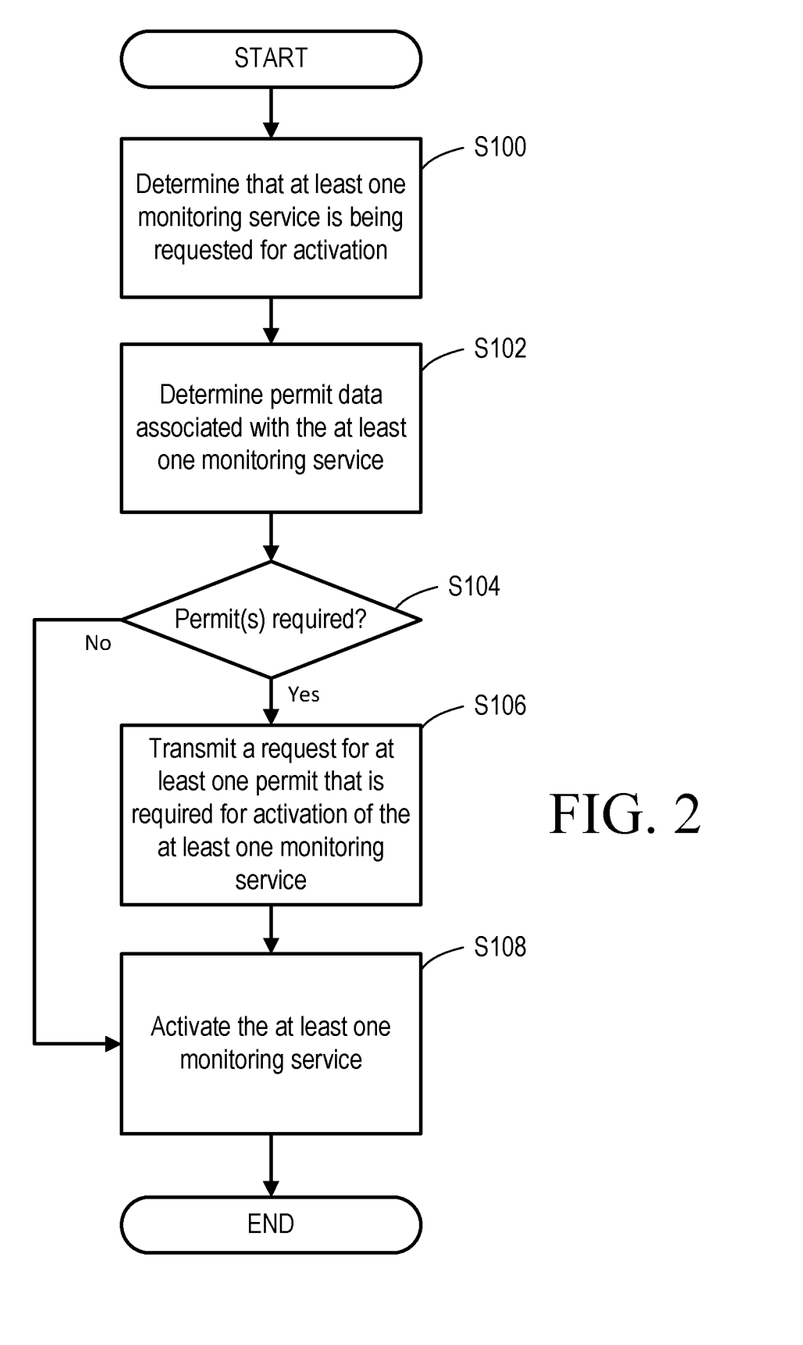
FIG. 2 illustrates an exemplary process of a Monitoring-On-Demand (MOD) module for managing the permitting of one or more monitoring services in accordance with the principles of the invention.

An exemplary process of MOD module 30 for managing the permitting of one or more monitoring services of premises apparatus 12 is illustrated in FIG. 2. Processor 26 determines that at least one monitoring service is being requested for activation (Block S100). In one or more embodiments, premises apparatus 12 may be a DIY premises system that allows a user to dynamically activate one or more monitoring services such as MOD services during installation or at a later time during premises apparatus 12 operation. For example, a user may not initially be interested in one or more monitoring services that require one or more permits such that the premises apparatus 12 initially operates without required permits, i.e., the activated functionality does not require permits. However, later in time, the user may decide to activate one or more monitoring services such as fire alarm monitoring that requires a permit. The request to activate one or more monitoring services may be performed via input device 25, via a web browser interface of facilitator server 16 or premises apparatus 12, and/or other methods that allow premises apparatus 12 to determine whether the request has been made by the user associated with premises apparatus 12. For example, processor 26 determines the user has requested a monitoring service, e.g., fire alarm monitoring and/or security alarm monitoring, via input device 25 in which the monitoring service requires one or more permits. Various techniques for authenticating a user and determining a user's permissions to use or perform a function are known and are beyond the scope of this disclosure.

In one or more embodiments, premises apparatus 12 downloads data that designates one or more monitoring services that require permits for location of the premises apparatus 12. For example, premises apparatus 12 may download data from facilitator server 16, permit distributor and/or permit database 20, among other information sources. Premises apparatus 12 may determine its location via methods known in the art such as through global positioning system (GPS), and/or may determine its location based on user inputs via input device 25, e.g., input of a zip code, city, county, etc. such that premises apparatus may download data specific to the determined location such as to determine if the required MOD service(s) require permit(s).

Processor 26 determines permit data associated with the at least one monitoring service (Block S102). For example, processor 26 determines permit data associated with the premises and/or premises location where the monitoring service is requested. The permit data may include the number of permits required for the monitoring service(s), whether one or more permits are required for the one or more requested monitoring services, the estimated cost for the permit(s), fines for not acquiring the permit(s), conditions for acquiring permits, customer data such as address/location, premises characteristics, account information, etc., and/or other information/data. In one or more embodiments, processor 26 may determine at least a portion of permit data by requesting the permit data from permit database 20, facilitator server 16 and/or permit distributor 18 such that permit data is downloaded to premises apparatus 12. Permit data may also include data input by a user via input device 25. In one or more embodiments, processor 26 sends one or more user devices notifications and/or reminder notifications that one or more permits are required, thereby prompting a user to provide permit data and/or verify the permit data as discussed below. In one or more embodiments, process causes display 27 to display a notification and/or reminder notification that one or more permits are required, thereby prompting a user to provide permit data and/or verify the permit data as discussed below.

Processor 26 determines if at least one permit is required (Block S104). For example, the permit data indicates whether one or more permits are required for the one or more requested monitoring services. If processor 26 determines at least one permit is required, processor 26 transmits a request for at least one permit that is required for activation of the at least one monitoring service (Block S106). In one or more embodiments, the permit request is transmitted to permit distributor 18 via network 14, or via network 14 and facilitator server 16. The permit request may include permit data and/or other data for acquiring the permit(s). For example, the permit data contained in the permit request may include a premises address, monitoring service(s) requested, premises characteristics (e.g., building type, etc.), customer information, estimated cost, notification information and any information related to the premises system and/or response to an alarm. Further, payment for the costs associated with the one or more permits may be obtained via credit card, digital currency, invoice, etc. In one embodiment, the transmitted request is sent to the user so that the user can forward the request to the permitting agency or otherwise take action to obtain the permit.

After transmitting the request for the at least one permit for activation of the at least one monitoring service, processor 26 activates the at least one monitoring service (Block S108). For example, processor 26 may determine that permits for security and fire monitoring have been received such that processor initiates activation of one or more monitoring services related to security and fire monitoring. In one or more embodiment, if the sensors and/or components are installed for the one or more monitoring services, the monitoring services are activated and may begin functioning based on the determination of Block S108. In one or more embodiments, if the sensors and/or components for performing the requested monitoring services are not installed, premises apparatus 12 may at least temporarily delay the activation of the requested monitoring services such as to allow time for installation of the required sensors and/or components for the service. In one or more embodiments, processor 26 initiates the ordering of the components and/or sensors needed for the requested monitoring service. In one or more embodiments, in response to determining the at least one premises sensor and/or component associated with the at least one monitoring service being requested has not been installed, processor 26 causes transmission of at least one notification to at least one user device associated with the premises apparatus. The notification may indicate the at least one premises sensor and/or component that need to be installed in order to activate the at least one monitoring service. In one or more embodiments, in response to determining the at least one premises sensor and/or component associated with the at least one monitoring service being requested has not been installed, processor 26 automatically schedules delivery and/or installation of the at least one premises sensor and/or component. For example, processor 26 schedules delivery of the at least one premises sensor and/or component, for example, to the premises being monitored by premises apparatus 12. Processor 26 may also schedule installation of the at least one premises sensor and/or component by a service technician.

Referring back to Block S104, if processor 26 determines that the one or more required permit(s) has not been acquired, processor 26 preforms the function(s) of Block S108. In one or more embodiments, processor 26 causes one or more icons illustrated on display 27 to indicate that the one or more monitoring services are active and/or not active.

In another embodiment the processor 26 is further configured to determine a location of the premises apparatus and to compare the determined location of the premises apparatus with a location stored by the premises apparatus 12, such as in memory 28. If the determined location of the premises apparatus 12 does not match with the location stored in premises apparatus 12, the monitoring service(s) are at least temporarily deactivated. This can also trigger a request to determine whether a permit is required and start the process at block S100. In one embodiment, the monitoring services are not deactivated, but the process is stared again at block S100 to determine whether a permit is required for the new location. Of note, it is not required that premises apparatus 12 store its location. It is contemplated that the location of premises apparatus 12 can be stored elsewhere, such as in facilitator server 16.

Also, in one embodiment, the location of the premises apparatus 12 is determined based on at least one of an internet protocol address of the premises apparatus and global positioning coordinates of the premises apparatus. Also, a user may also manually input the address, allowing processor 26 to determine that the location data has changed. In another embodiment, processor 26 is further configured to transmit a request for at least one permit that is required for activation of the at least one monitoring service at the determined location when the location has changed. Such a request can be via facilitator server 16 or via the user. In other words, the request for the at least one permit that is required for activation of the at least one monitoring service at the determined location is transmitted to one of a customer associated with the premises apparatus and a jurisdictional entity associated with the determined location, via facilitator server 16 in one embodiment. In another embodiment, activation of the monitoring services can be delayed if processor 26 determines that premises device 12 has been moved, i.e., that the determined location does not match the stored location of premises device 12.

Figure 3:
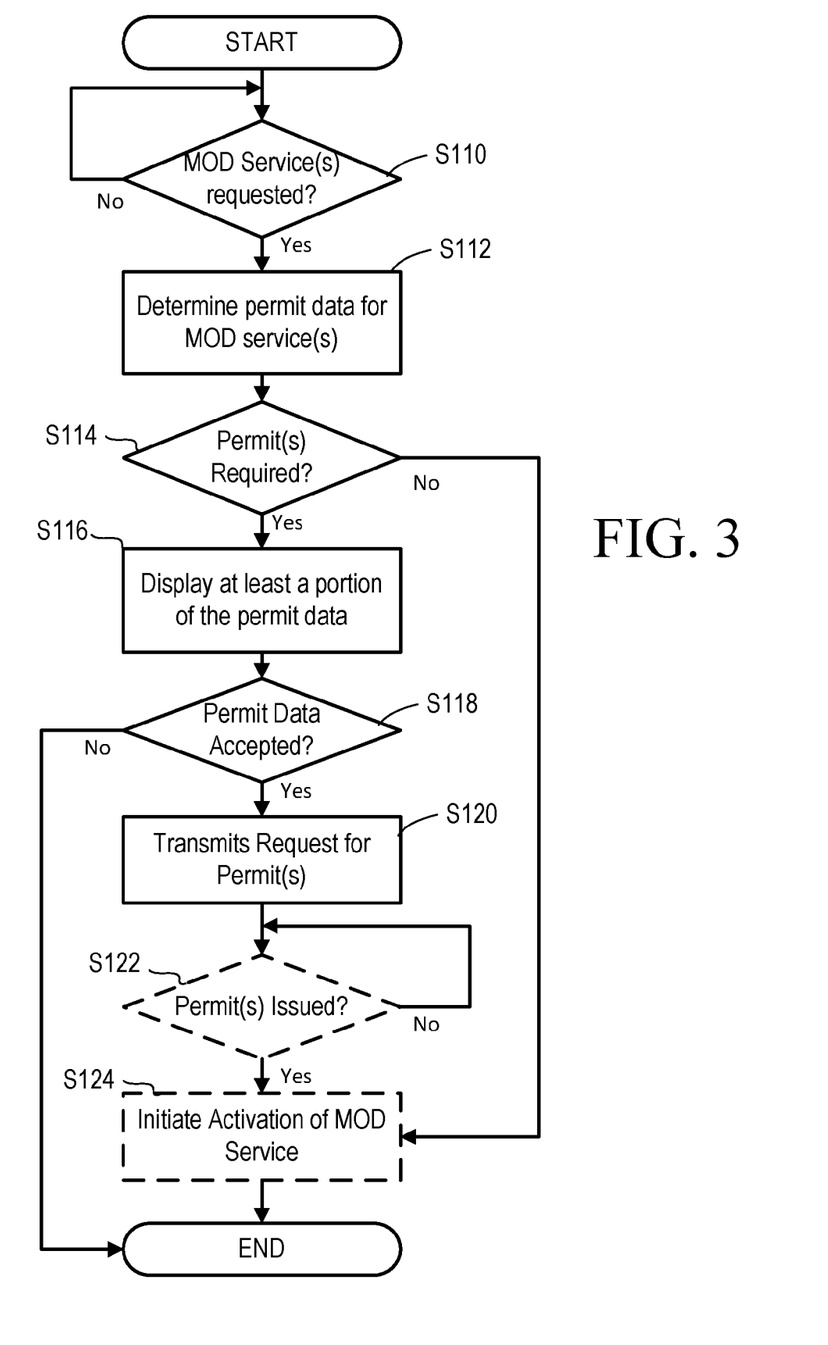
FIG. 3 illustrates an exemplary process of another embodiment of a Monitoring-On-Demand (MOD) module for managing the permitting of one or more MOD services in accordance with the principles of the invention.

Another embodiment of an exemplary process of MOD module 30 for managing the permitting of one or more MOD services of premises apparatus 12 is illustrated in FIG. 3. Processor 26 determines whether a MOD service has been requested (Block S110). In one or more embodiments, premises apparatus 12 may be a DIY premises system that allows a user to dynamically activate one or more MOD services during installation or at a later time during premises apparatus 12 operation. For example, a user may not initially be interested in one or more MOD services that require one or more permits such that the premises apparatus 12 initially operates without required permits, i.e., the activated functionality does not require permits. However, later in time, the user may decide to activate one or more MOD services such as fire alarm monitoring that requires a permit. The request to activate one or more MOD services may be performed via input device 25, via a web browser interface of facilitator server 16 or premises apparatus 12, and/or other methods that allow premises apparatus 12 to determine whether the request has been made by the user associated with premises apparatus 12. For example, processor 26 determines the user has requested a MOD service, e.g., fire alarm monitoring and/or security alarm monitoring, via input device 25 in which the MOD service requires one or more permits. Various techniques for authenticating a user and determining a user's permissions to use or perform a function are known and are beyond the scope of this disclosure.

In one or more embodiments, premises apparatus 12 downloads data that designates one or more MOD services that require permits for location of the premises apparatus 12. For example, premises apparatus 12 may download data from facilitator server 16, permit distributor and/or permit database 20, among other information sources. Premises apparatus 12 may determine its location via methods known in the art such as through global positioning system (GPS), and/or may determine its location based on user inputs via input device 25, e.g., input of a zip code, city, county, etc. such that premises apparatus may download data specific to the determined location such as to determine if the required MOD service(s) require permit(s).

If processor 26 determines a MOD service has not been requested, processor 26 repeats the determination of Block S110. In one or more embodiments, the determination may be repeated periodically, continuously, on demand or based on a predefined schedule. If processor 26 determines a MOD service has been requested, processor 26 determines permit data for the MOD service (Block S112). For example, processor 26 determines permit data associated with the premises and/or premises location where the MOD service is requested. The permit data may include the number of permits required for the MOD service(s), whether one or more permits are required for the one or more requested MOD services, the estimated cost for the permit(s), fines for not acquiring the permit(s), conditions for acquiring permits, customer data such as address/location, premises characteristics, account information, etc., and/or other information/data. In one or more embodiments, processor 26 may determine at least a portion of permit data by requesting the permit data from permit database 20, facilitator server 16 and/or permit distributor 18 such that permit data is downloaded to premises apparatus 12. Permit data may also include data input by a user via input device 25. In one or more embodiments, processor 26 sends one or more user devices notifications and/or reminder notifications that one or more permits are required, thereby prompting a user to provide permit data and/or verify the permit data as discussed below. In one or more embodiments, process causes display 27 to display a notification and/or reminder notification that one or more permits are required, thereby prompting a user to provide permit data and/or verify the permit data as discussed below.

Processor 26 determines whether at least one permit is required for the requested MOD service(s) based on the permit data (Block S114). For example, the permit data indicates whether one or more permits are required for the one or more requested MOD services. If processor 26 determines at least one permit is required, processor 26 causes at least a portion of the permit data to be displayed by display 27 (Block S116). For example, the at least the portion of permit data that is displayed may include the estimated cost/fee(s) for the required permits for the MOD service(s), estimated fine cost for failing to acquire permits and/or other data. Processor 26 determines whether the permit data has been accepted (Block S118). In one or more embodiments, the determination of whether the permit data has been accepted is based on one or more inputs received from a user via input device 25. For example, a user may use input device 25 such as a keyboard or touchscreen to indicate that the user accepts the estimated cost that were displayed during Block S116. If processor 26 determines the permit data has not been accepted, processor 26 ends the processor of FIG. 3. In one or more embodiments, the requested MOD services are not activated or operational for premises apparatus 12 if processor 26 determines the permit data was not accepted.

However, if processor 26 determines that the permit data has been accepted, processor 26 causes a permit request to be transmitted (Block S120). In one or more embodiments, the permit request is transmitted to permit distributor 18 via network 14, or via network 14 and facilitator server 16. The permit request may include permit data and/or other data for acquiring the permit(s). For example, the permit data contained in the permit request may include a premises address, MOD service(s) requested, premises characteristics (e.g., building type, etc.), customer information, estimated cost, notification information and any information related to the premises system and/or response to an alarm. Further, payment for the costs associated with the one or more permits may be obtained via credit card, digital currency, invoice, etc.

Processor 26 determines whether a permit has been issued (Block S122). In one or more embodiments, processor 26 may request an update from facilitator server 16 and/or permit database as to whether the requested permit(s) associated with the premises have been issued. In one or more embodiments, premises apparatus 12 is updated periodically as to issued permits associated with the premises or may be updated when a new permit is issued. As will be discussed below with reference to FIG. 4, a record of acquired permits may be stored in permit database 20. If processor 26 determines the one or more requested permits haves not been issued, processor 26 repeats the determination of Block S122. In one or more embodiments, the determination may be repeated periodically, continuously or based on a predefined schedule. In one or more embodiments, the requested one or more MOD services optionally remain deactivated until processor 26 determines one or more permits for the requested MOD service have issued. In one or more embodiments, the determination of Block S122 may determine if a permit was denied in which case processor 26 causes the process for managing the permitting of one or more MOD services of premises apparatus 12 to end, and may notify one or more users and/or facilitator server 16 of the denied permit.

In one optional embodiment, if processor 26 determines that the requested one or more permits have been issued, processor 26 initiates activation of the one or more MOD services associated with the issued permits (Block S124). For example, processor 26 may determine that permits for security and fire monitoring have been received such that processor initiates activation of one or more MOD services related to security and fire monitoring. In one or more embodiment, if the sensors and/or components are installed for the one or more MOD services, the MOD services are activated and may begin functioning based on the determination of Block S124. In one or more embodiments, if the sensors and/or components for performing the requested MOD services are not installed, premises apparatus 12 may initiate the requested MOD services upon installation of the required sensors and/or components for the service. For example, in response to determining the at least one premises sensor and/or component associated with the at least one MOD service being requested has been installed, processor 26 initiates activation of the at least one MOD service. In one or more embodiments, processor 26 initiates the ordering of the components and/or sensors needed for the requested MOD service. Further, in one or more embodiments, in response to determining the at least one premises sensor and/or component associated with the at least one MOD service being requested has not been installed, processor 26 inhibits the activation of the at least one MOD service such as at least until the at least one premises sensor and/or component has been installed. In one or more embodiments, in response to determining the at least one premises sensor and/or component associated with the at least one MOD service being requested has not been installed, processor 26 causes transmission of at least one notification to at least one user device associated with the premises apparatus. The notification may indicate the at least one premises sensor and/or component that need to be installed in order to activate the at least one MOD service. In one or more embodiments, in response to determining the at least one premises sensor and/or component associated with the at least one MOD service being requested has not been installed, processor 26 automatically schedules delivery and/or installation of the at least one premises sensor and/or component. For example, processor 26 schedules delivery of the at least one premises sensor and/or component, for example, to the premises being monitored by premises apparatus 12. Processor 26 may also schedule installation of the at least one premises sensor and/or component by a service technician.

In an alternative embodiment, processor 26 may periodically perform only Block S122 for premises apparatus 12, thereby allowing premises apparatus 12 to discover newly issued permits and/or expired permits that require renewal. In another alternative embodiment, Block S122 and S124 may be skipped or omitted from the process of FIG. 3 based on design need. If processor 26 determines that the one or more required permit(s) has not been acquired, processor 26 may repeat the determination of Block S122. In one or more embodiments, processor 26 causes one or more icons illustrated on display 27 to indicate that the one or more MOD services are not active. Referring back to Block S114, if processor 26 determines no permit(s) are required for the one or more MOD services based on permit data, processor 26 initiates activation of the one or more MOD services as described above in Block S124.

Figure 4:
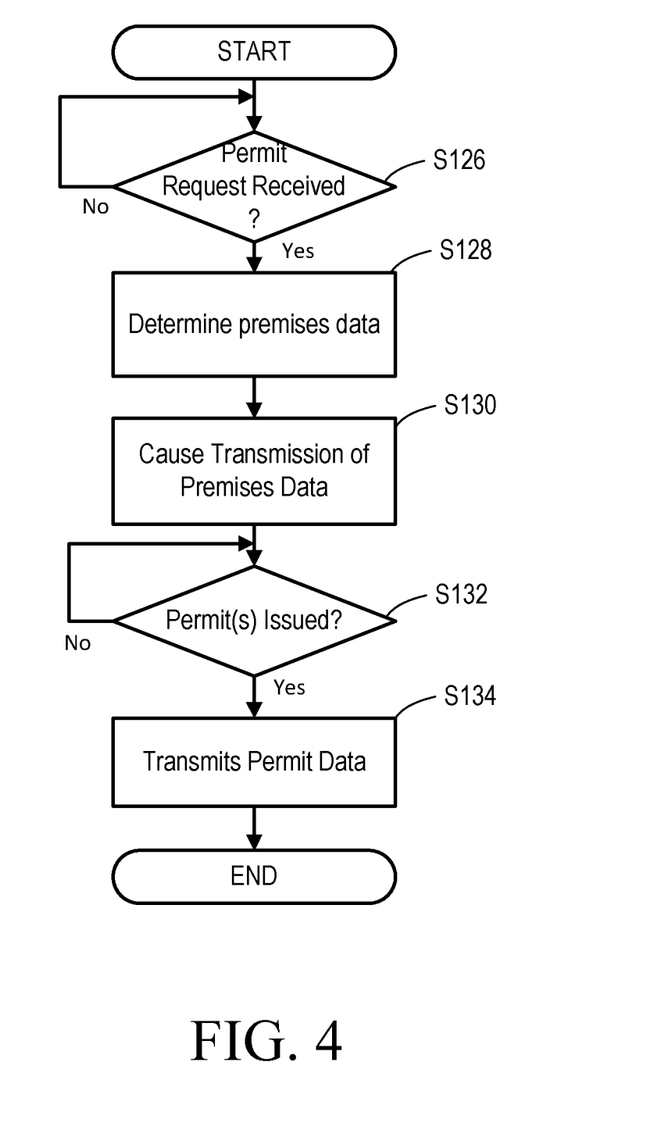
FIG. 4 illustrates an exemplary permit acquisition process of acquisition module in accordance with the principles of the invention.

An exemplary permit acquisition process of acquisition module 40 is illustrated in FIG. 4. Processor 36 determines whether a permit request message has been received (Block S126). In one or more embodiments, processor 36 determines whether a permit request message has been received from premises apparatus 12. The permit request may include permit data and/or other data as discussed above in FIG. 3. If processor 36 determines that a permit request has not been received, processor 36 repeats the determination of Block S126. For example, processor 36 may repeat the determination of Block S126 periodically, continuously or based on a predefined schedule.

If processor 36 determines a permit request has been received, processor 36 determines premises data (Block S128). In one or more embodiments, processor 36 determines premises data based on the permit data and/or other data in the permit request. For example, the permit data in the permit request may include customer information, premises characteristics such as location and other information needed to acquire one or more MOD permits in which the determined premises data is based on the received permit data. Determined premises data may include customer information, premises characteristics, notification information and/or other information.

Processor 36 causes transmission of the premises data (Block S130). For example, processor 36 cause at least a portion of the determined premises data to be transmitted to permit distributor 18 in order to acquire the one or more requested permits. Processor 36 determines whether the one or more of the requested permits have been issued (Block S132). In one or more embodiments, processor 36 requests one or more updates from permit distributor 18 and/or permit database as to whether one or more of the requested permits have been issued. In one or more alternative embodiments, facilitator server 16 is notified of an issued permit. For example, facilitator server 16 may be notified of new permits issued by permit distributor 18. In one embodiment the notification is in the form of an electronic message. If processor 36 determines that the one or more requested permits have not been issued, processor 36 repeats the determination of Block S132. In one or more alternative embodiments, if processor 36 determines that the one or more requested permits have been denied, processor 36 may notify one or more persons associated with the premises via premises apparatus 12. If processor 36 determines that the one or more requested permits have issued, processor 36 transmits permit data to premises apparatus (Block S134). In one or more embodiments, the permit data indicates the one or more requested permits have been issued or acquired.

Figure 5:
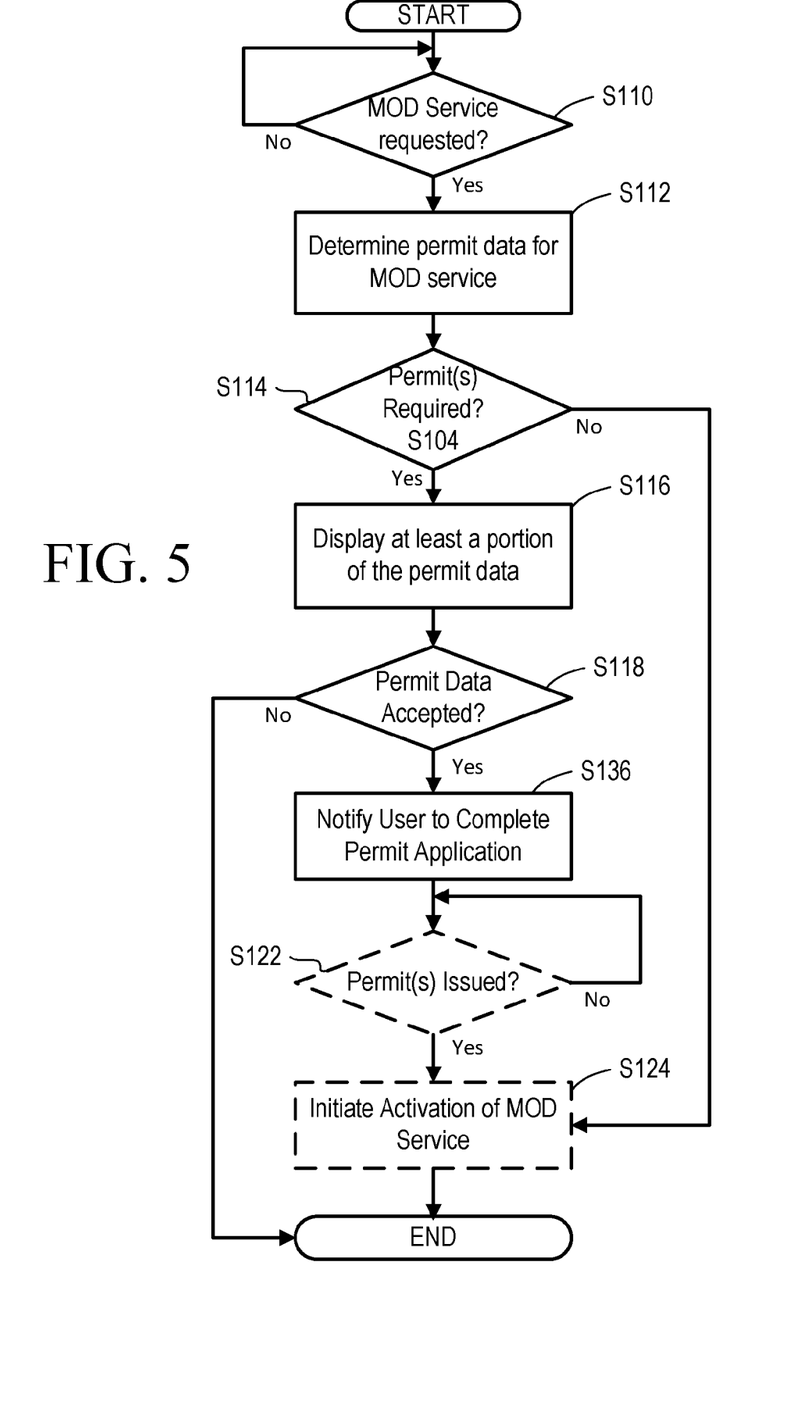
FIG. 5 illustrates an alternative process of MOD module for managing the permitting of one or more MOD services in accordance with the principles of the invention.

An alternative process of MOD module 30 for management the permitting of one or more MOD services is illustrated in FIG. 5. Blocks S110-S118 and S122-S124 as discussed above with respect to FIG. 3. Referring to Block S118, if the permit data is accepted, processor 26 causes a notification to complete a permit application to be transmitted to one or more user associated with the premises (Block S136). In other words, the customer is ultimately responsible for submitting the permit application to permit distributor 18 such that premises apparatus 18 does not transmit the request for a permit to permit distributor 18. In one or more embodiments, processor 26 generates an electronic version of the permit application so that the customer can submit the application electronically, or can print the electronic application for physical submission in person or via mail.

Figure 6:
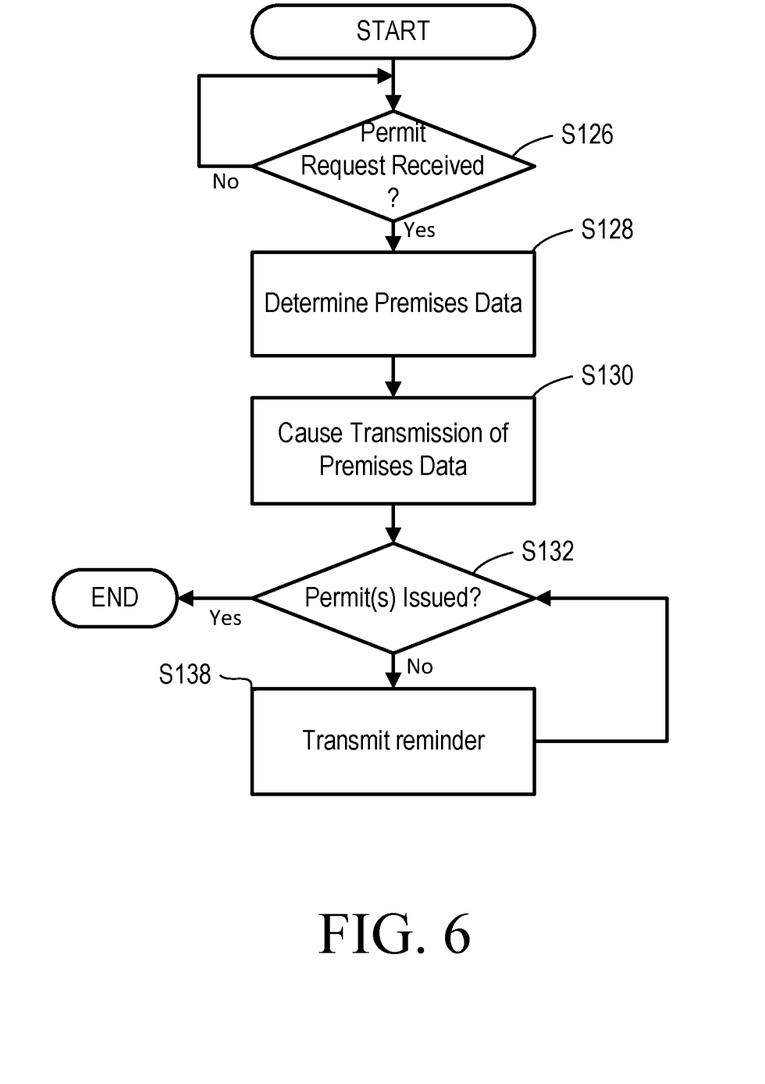
FIG. 6 illustrates an alternative permit acquisition process of acquisition module in accordance with the principles of the invention.

An alternative permit acquisition process of acquisition module 40 is illustrated in FIG. 6. Blocks S126-S132 are discussed above with respect to FIG. 4. Processor 36 determines whether the one or more of the requested permits have been issued as discussed above with respect to Block S132. However, if processor 36 determines that the one or more requested permits have not been issued, processor 36 causes a reminder message to be transmitted (Block S138). In one or more embodiments, processor 36 causes a reminder message to be transmitted to one or more user devices, e.g., mobile phone, tablets, desktop, etc., and/or one or more electronic accounts, e.g., email, profiles, etc., associated with the premises. Processor 36 then repeats the determination of Block S138. If processor 36 determines the one or more requested permits have been issued, processor 36 ends the permit acquisition process. In other words, facilitator server 16 reminds the user to submit one or more permit applications if the requested permits have not been issued.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby form a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the disclosure.

What is claimed is:

1. A premises apparatus, comprising:
a processor, the processor configured to:
   determine that at least one monitoring service is being requested for activation;
   determine permit data associated with the at least one monitoring service;
   if the determined permit data indicates at least one permit is required for the at least one monitoring service:
      transmit a request for at least one permit that is required for activation of the at least one monitoring service;
      after transmitting the request for the at least one permit for activation of the at least one monitoring service, activate the at least one monitoring service;
   determine a location of the premises apparatus;
   compare the determined location of the premises apparatus with a location stored at premises apparatus; and
   if the determined location of the premises apparatus does not match with the location stored at premises apparatus, at least temporarily deactivate the at least one monitoring service.

2. The premises apparatus of claim 1, wherein the processor is further configured to:
   cause at least a portion of the determined permit data to be displayed for acceptance by a user;
   determine whether a user has accepted the determined permit data; and
   the transmitting of the request for the at least one permit being in response to determining that the user has accepted the determined permit data.

3. The premises apparatus of claim 1, wherein the determined location of the premises apparatus is determined based on one of an internet protocol address of the premises apparatus and global positioning coordinates of the premises apparatus.

4. The premises apparatus of claim 3, wherein the processor is further configured to transmit a request for at least one permit that is required for activation of the at least one monitoring service at the determined location.

5. The premises apparatus of claim 4, wherein the request for the at least one permit that is required for activation of the at least one monitoring service at the determined location is transmitted to one of a customer associated with the premises apparatus and a jurisdictional entity associated with the determined location.

6. The premises apparatus of claim 1, wherein the at least one monitoring service includes at least one of fire alarm monitoring service and security alarm monitoring service.

7. The premises apparatus of claim 1, wherein the processor is further configured to:
   determine whether at least one premises sensor has been installed, the at least one premises sensor being associated with the at least one monitoring service being requested;
   in response to determining the at least one premises sensor associated with the at least one monitoring service has not been installed, at least delay the activation of the at least one monitoring service.

8. The premises apparatus of claim 7, wherein the processor is further configured to:
in response to determining the at least one premises sensor associated with the at least one monitoring service has not been installed, cause transmission of at least one notification to at least one user device associated with the premises apparatus, the notification indicating the at least one premises sensor that needs to be installed for activation of the at least one monitoring service.

9. The apparatus of claim 8, wherein the at least one premises sensor is at least one life safety sensor including at least one of a motion sensor, fire sensor, carbon monoxide sensor, flooding sensor and contact sensor.

10. A method, comprising:
determining that at least one monitoring service is being requested for activation;
determining permit data associated with the at least one monitoring service;
if the determined permit data indicates at least one permit is required for the at least one monitoring service:
transmitting a request for at least one permit that is required for activation of the at least one monitoring service; and
after transmitting the request for the at least one permit for activation of the at least one monitoring service, activating the at least one monitoring service;
determining a location of a premises apparatus;
comparing the determined location of the premises apparatus with a stored location of the premises apparatus; and
if the determined location of the premises apparatus does not match the stored location of the premises apparatus, at least temporarily deactivating the at least one monitoring service.

11. The method of claim 10, further comprising:
causing at least a portion of the determined permit data to be displayed for acceptance by a user;
determining whether a user has accepted the determined permit data; and
the transmitting of the request for the at least one permit being in response to determining that the user has accepted the determined permit data.

12. The method of claim 10, wherein the determined location of the premises apparatus is determined based on one of an internet protocol address of the premises apparatus and global positioning coordinates of the premises apparatus.

13. The method of claim 12, further comprising transmitting a request for at least one permit that is required for activation of the at least one monitoring service at the determined location.

14. The method of claim 10, wherein the request for the at least one permit that is required for activation of the at least one monitoring service at the determined location is transmitted to one of a customer associated with the premises apparatus and a jurisdictional entity associated with the determined location.

15. The method of claim 10, wherein the at least one monitoring service includes at least one of fire alarm monitoring service and security alarm monitoring service.

16. The method of claim 10, further comprising:
determining whether at least one premises sensor has been installed, the at least one premises sensor being associated with the at least one monitoring service being requested;
in response to determining the at least one premises sensor associated with the at least one monitoring service has not been installed, at least delaying the activation of the at least one monitoring service.

17. The method of claim 16, further comprising:
in response to determining the at least one premises sensor associated with the at least one monitoring service has not been installed, causing transmission of at least one notification to at least one user device associated with the premises apparatus, the notification indicating the at least one premises sensor that needs to be installed for activation of the at least one monitoring service.

18. The method of claim 17, wherein the at least one premises sensor is at least one life safety sensor including at least one of a motion sensor, fire sensor, carbon monoxide sensor, flooding sensor and contact sensor.

19. A premises security system, comprising:
at least one sensor;
a premises apparatus, the premises apparatus including:
a processor, the processor configured to:
determine that at least one monitoring service is being requested for activation;
determine a location of the premises apparatus;
determine permit data associated with the at least one monitoring service, the determination of permit data associated with the at least one monitoring service being based on the determined location of the premises apparatus;
if the determined permit data indicates at least one permit is required for the at least one monitoring service:
transmit a request for at least one permit that is required for activation of the at least one monitoring service;
determine whether the at least one premises sensor has been installed in the premises system, the at least one premises sensor being associated with the at least one monitoring service being requested; and
in response to determining the at least one premises sensor associated with the at least one monitoring service has been installed and after transmitting the request for the at least one permit for activation of the at least one monitoring service, activate the at least one monitoring service.

20. The premises security system of claim 19, wherein the processor is further configured to:
compare the determined location of the premises apparatus with a stored location of the premises apparatus;
if the determined location of the premises apparatus does not match with the stored location of the premises apparatus, at least temporarily inhibiting activation of the at least one monitoring service.

* * * * *